Figure 1:
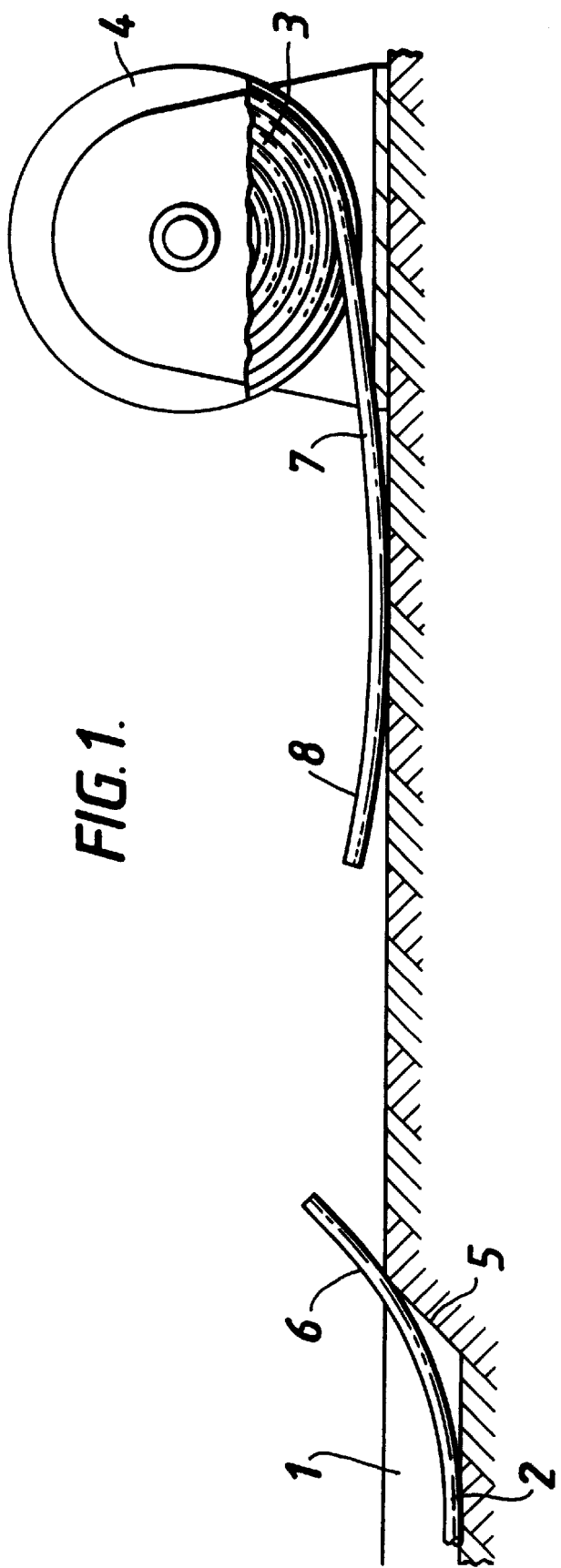

United States Patent [19]
Pascoe

[11] Patent Number: 5,967,698
[45] Date of Patent: Oct. 19, 1999

[54] PERMITTING TWO ADJACENT PIPE LENGTHS TO BE JOINED TOGETHER

[75] Inventor: Michael Pascoe, Falmouth, United Kingdom

[73] Assignee: BG PLC, Reading, United Kingdom

[21] Appl. No.: 08/811,020

[22] Filed: Mar. 4, 1997

[30] Foreign Application Priority Data

Mar. 4, 1996 [GB] United Kingdom .................. 9604610

[51] Int. Cl.⁶ .................................................. F16L 1/028
[52] U.S. Cl. ............................................. 405/174; 405/154
[58] Field of Search ............................ 285/18, 419, 373, 285/62; 405/174 CR, 169, 170, 159, 168.1, 168.3, 155, 156, 157, 154

[56] References Cited

U.S. PATENT DOCUMENTS

| | | | |
|---|---|---|---|
| 3,598,430 | 8/1971 | O'Halloran | 285/24 |
| 3,769,836 | 11/1973 | Heldenbrand | 72/302 |
| 3,938,234 | 2/1976 | Price | 29/237 |
| 4,113,286 | 9/1978 | Kenndedy, Jr. | 285/61 |
| 4,117,692 | 10/1978 | Oberg | 405/166 |
| 4,890,957 | 1/1990 | Rinas | 405/174 |
| 4,906,131 | 3/1990 | Savoka | 405/36 |
| 5,348,459 | 9/1994 | Sauron | 425/11 |
| 5,464,308 | 11/1995 | Missout | 405/183 |
| 5,641,246 | 6/1997 | Rinas | 405/174 |

FOREIGN PATENT DOCUMENTS

| | | |
|---|---|---|
| 0220095 | 4/1987 | European Pat. Off. . |
| 0507572 | 10/1992 | European Pat. Off. . |
| 3622965 | 11/1987 | Germany . |
| 1604950 | 12/1981 | United Kingdom . |
| 2224803 | 5/1990 | United Kingdom . |
| 2252386 | 8/1992 | United Kingdom . |
| 2291485 | 1/1996 | United Kingdom . |

Primary Examiner—Steven Meyers
Assistant Examiner—John B. Walsh
Attorney, Agent, or Firm—William H. Holt

[57] ABSTRACT

A method for permitting the joining together of two adjacent pipe lengths with adjacent ends curving with substantially the same sense, the method comprising rotating the end of one of the pipe lengths about its axis until it curves in substantially the opposite sense to the curve of the adjacent end of the other pipe length.

10 Claims, 6 Drawing Sheets

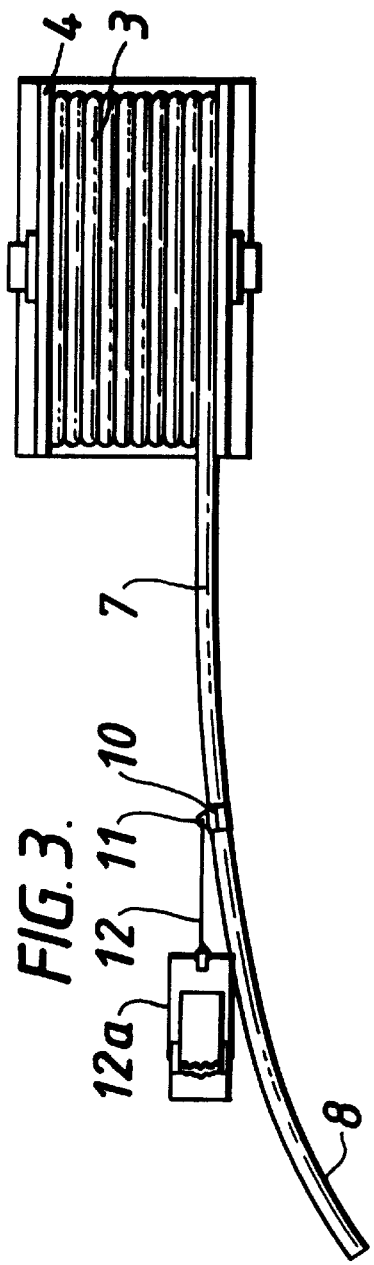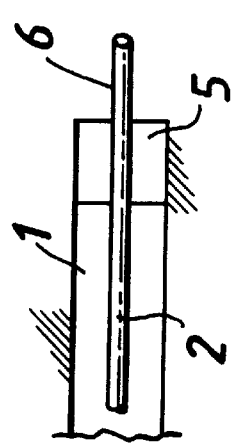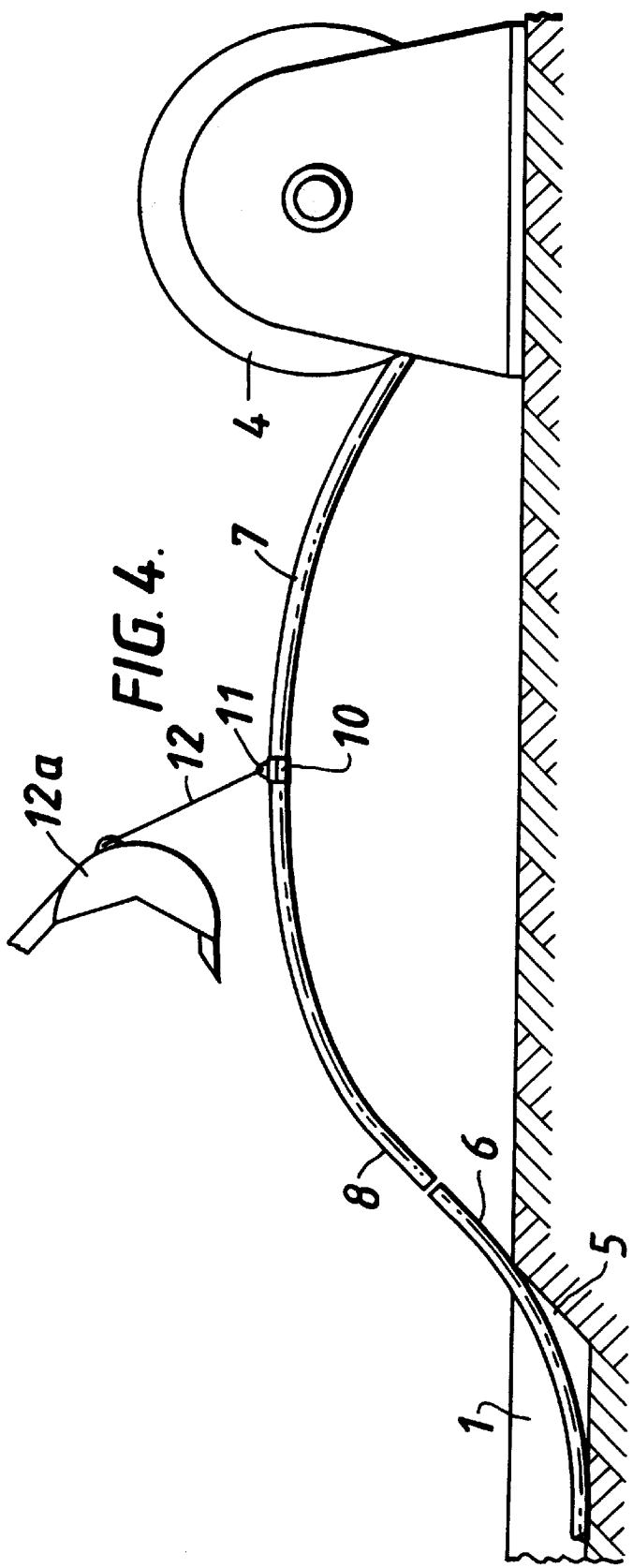

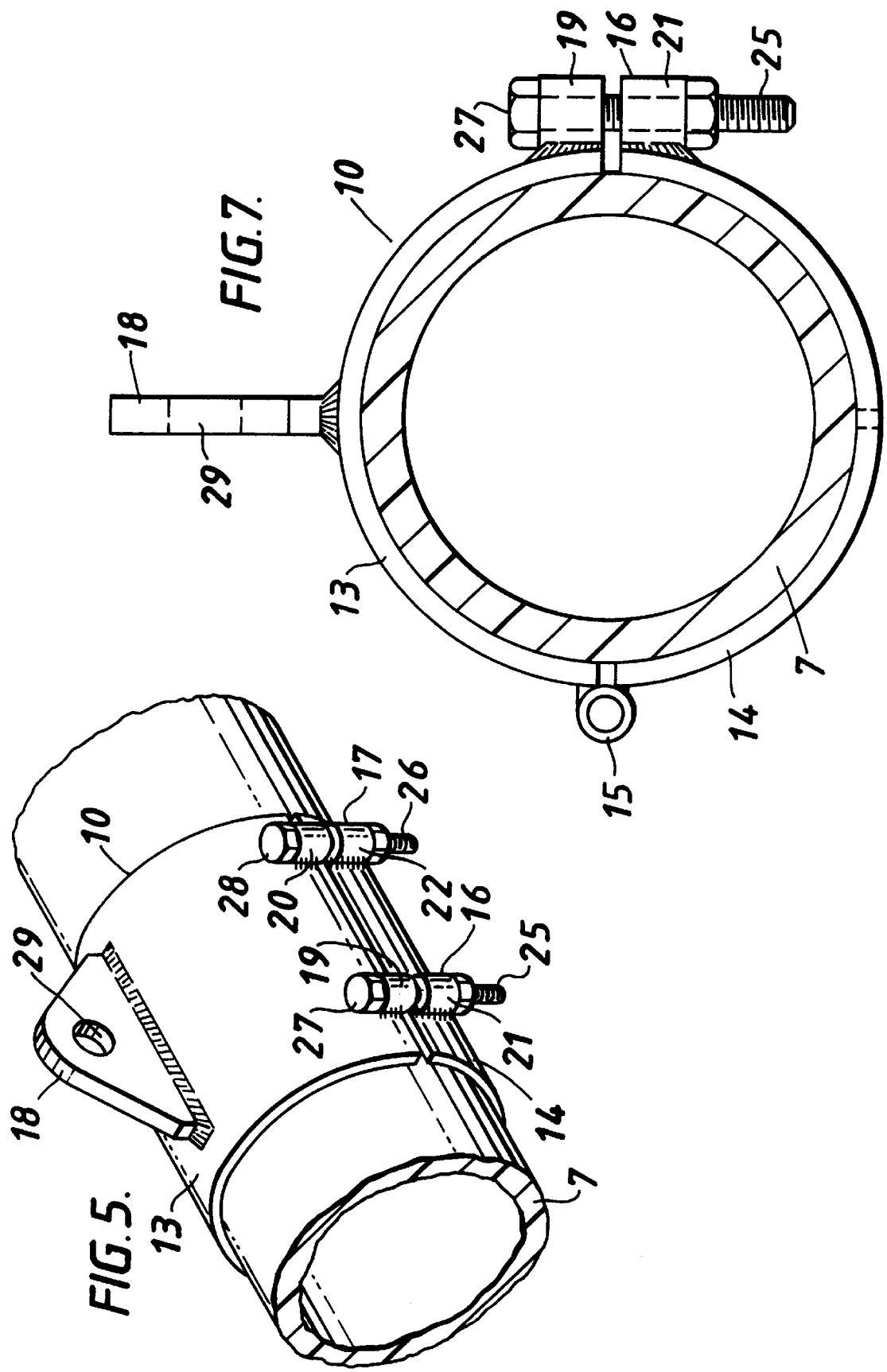

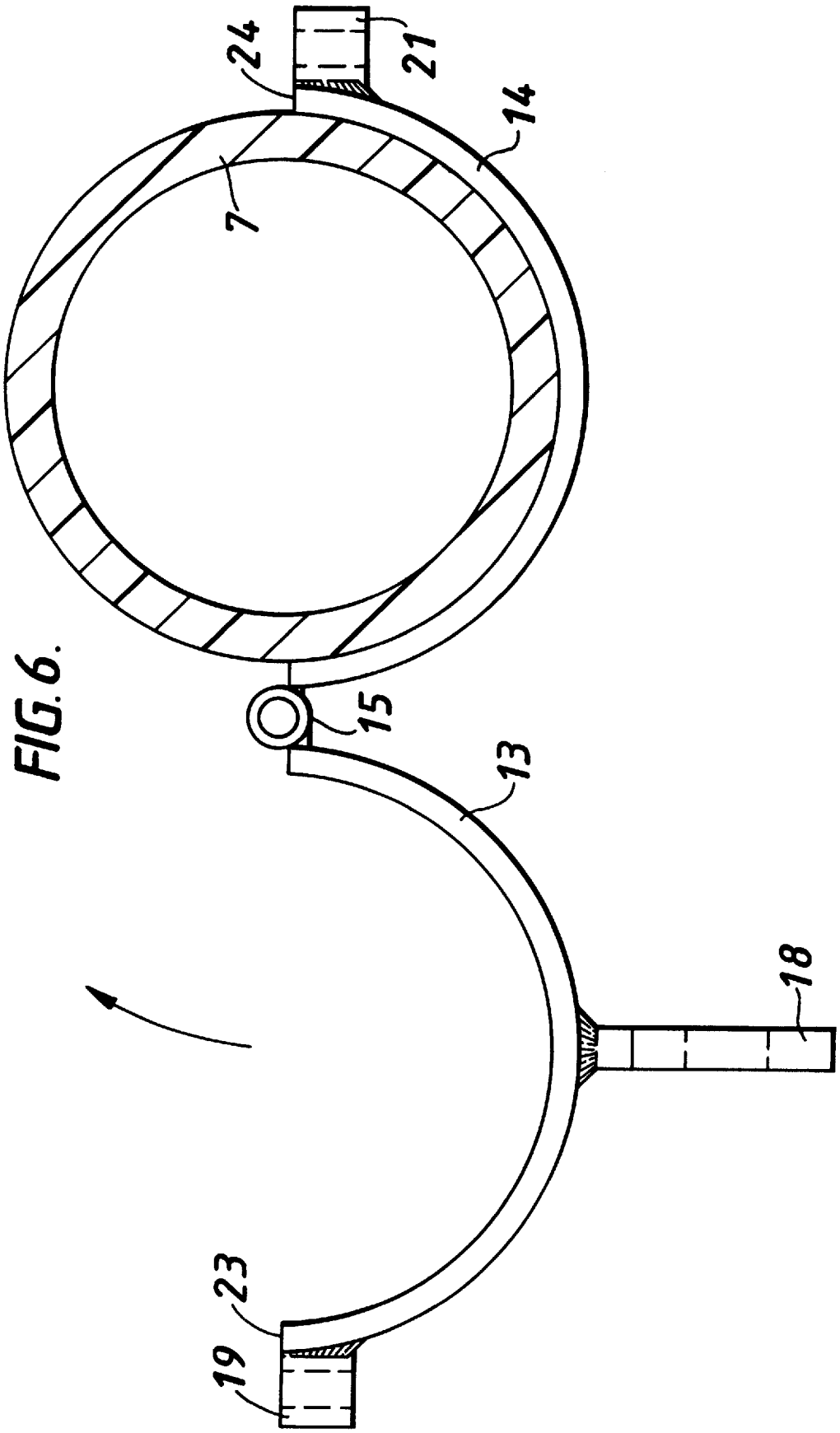

PERMITTING TWO ADJACENT PIPE LENGTHS TO BE JOINED TOGETHER

The present invention relates to permitting the joining together of two adjacent pipe lengths with adjacent ends curving with substantially the same sense.

Currently in the provision of new utility services (gas and water in particular) plastic, usually polyethylene, pipe is used as the pipeline material. The pipe is laid underground in trenches which are then back-filled with earth and ballast.

The pipe is fed as a coil from a reel, coiler or drum on which the pipe is wound. After a suitable length has been wound from the coiler it is cut from the coil and laid in the trench which has already been dug.

The near end of the trench-lying pipe is arranged to extend upwardly from the trench so that it terminates above ground level. The near end has an upwardly directed curve because the pipe has been stored as a coil and has assumed a slight curve along its length.

Then a further length is reeled from the coiler for joining to the length which is already located in the trench. As, with the current design of coilers, the length is reeled from the bottom of the coiler, the free end of the length also has an upwardly going curve as the pipe has been stored as a coil as has been explained. This makes it extremely difficult to join the adjacent ends of the pipe lengths together.

One current solution is to join a short straight length of pipe to each of the other lengths to eliminate or reduce the effect of the curve and then to join the straight lengths together. However, this is very time-consuming as it is necessary to conduct three jointing operations.

Another solution is to use a pipe straightening machine to straighten out the adjacent ends of the pipe lengths. However, this machine, which is hydraulically actuated, is not only heavy and cumbersome (it needs to be lifted by mechanical excavators to be moved about), it is also expensive to purchase.

Therefore it is an object of the present invention to provide a method for permitting the joining together of two adjacent pipe lengths with adjacent ends curving with substantially the same sense in which the disadvantages of the prior solutions are at least minimised.

According to one aspect of the present invention, a method is provided for permitting the joining together of two adjacent pipe lengths with adjacent ends curving with substantially the same sense, the method comprising rotating the end of one of the pipe lengths about its axis until it curves in substantially the opposite sense to the curve of the adjacent end of the other pipe length.

The ends of the pipe lengths may initially curve in a substantially upward direction.

One of the pipe lengths may be fed from a coil to a position where it lies on the ground.

Preferably the end of the coiled pipe length is rotated so that it curves in a substantially downward direction.

In one embodiment of the invention, on leaving the coil the curved end may be caused to lie on the ground with its curve parallel to the ground then the end is raised in such a manner that it rotates to a position where it curves in a substantially downward direction.

In this case, the other pipe length may be located in a trench with its end curving upwardly.

The pipe lengths are suitably of a flexible material, conveniently plastics and preferably polyethylene.

According to another aspect of the present invention, we provide a cylindrical pipe clamp comprising two hingeably connected semi-circular members which can be brought together around the circumference of a length of pipe, means for releasably securing the members together and means mounted on one of the members for releasably connecting the clamp to a hoisting apparatus whereby, in use, the clamp can be raised and lowered to raise and lower the pipe length.

Preferably the means for releasably connecting the clamp to a hoisting apparatus comprises a plate having an eyelet by which the clamp can be releasably tied to the hoisting apparatus by means of a strop.

Suitably means are provided to enable the members to clamp pipes of different external diameters.

According to a further aspect of the present invention, a pipeline comprises at least two discrete lengths of pipe joined together at adjacent ends, the leading end of each length except that length which is leading having been rotated about their axis substantially by 180°.

Figure 2:
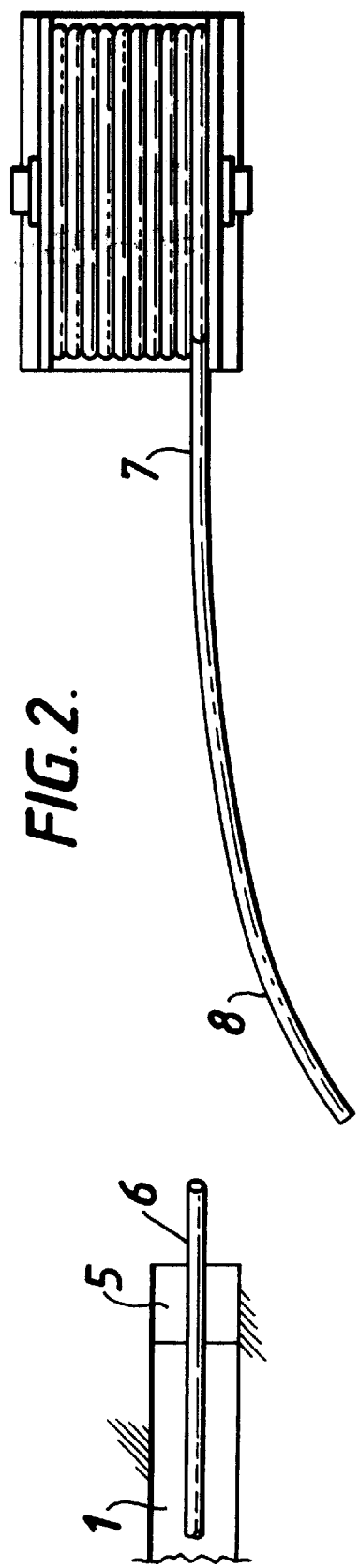
Figure 8:
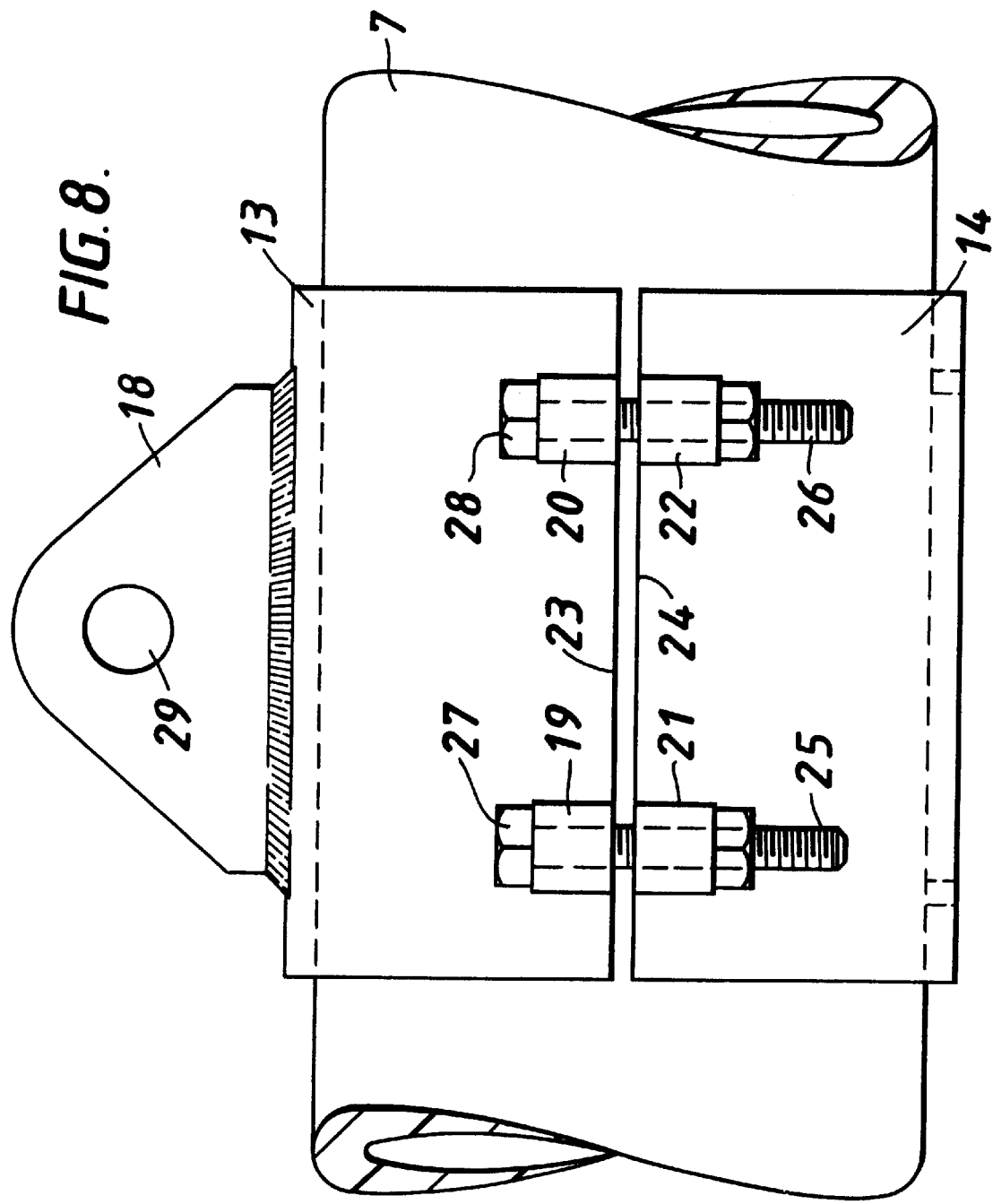
Figure 9:
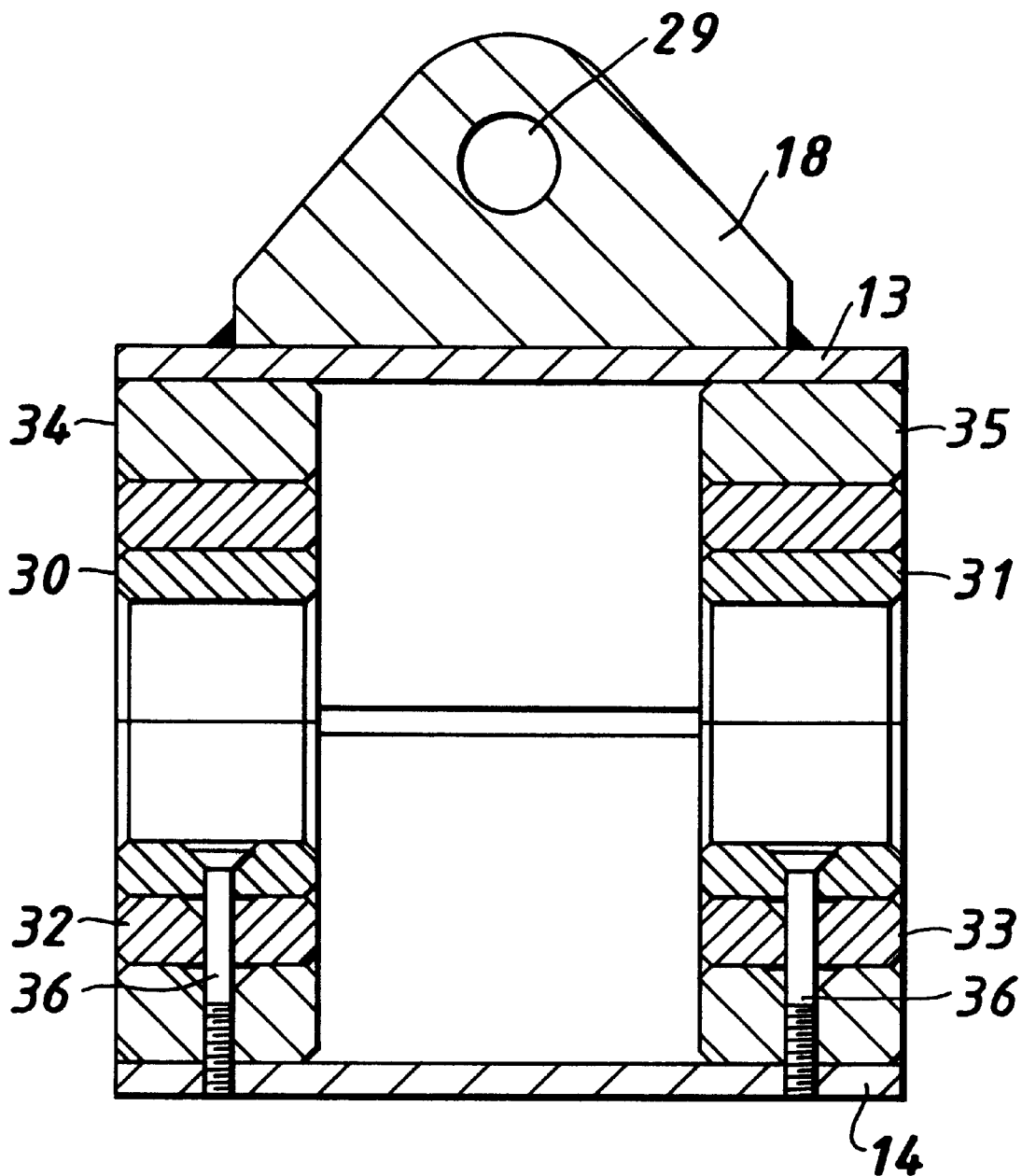

An embodiment of the present invention will now be particularly described with reference to the accompanying drawings in which:

FIG. 1 is a side view of a site with one pipe length already in a trench and another length being unwound from the coiler, FIG. 2 is an aerial view of FIG. 1 with the curved end of the coiled pipe length lying parallel to the ground, FIG. 3 is an aerial view similar to FIG. 2 with a pipe clamp secured to the coiled pipe length and connected to a hoisting apparatus in the form of a mechanical excavator, FIG. 4 is a side view similar to FIG. 1 with the coiled pipe length lifted and rotated 90° from its position in FIG. 2 so that the pipe end is now downwardly curving, FIG. 5 is an isometric view of the closed pipe clamp secured to a pipe, FIG. 6 is an end view of the clamp in an open position for securing to a pipe, FIG. 7 is a view similar to FIG. 6 with the pipe now clamped in position, FIG. 8 is a view of FIG. 7 from the bolted side, and FIG. 9 is a sectional view of the closed clamp showing segments located for different diameters of pipe.

Referring to FIG. 1 a trench 1 is dug and in it is located a first length 2 of previously coiled pipe of approximately 100 metres in length, the length 2 having been cut from a coil 3 of pipe wound onto the reel, coiler or drum 4 distanced from the near end 5 of the trench 1. The length 2 of pipe, which is of a suitable plastics material such as polyethylene, is manhandled into the trench 1 and a near end 6 of the length 2 (with respect to the reel 4) projects from the near end 5 of the trench with an upwardly directed curve to terminate above ground level. As previously explained the curve is caused because the pipe is stored as a coil on the reel 4.

A second length 7 of pipe is wound from the reel 4 and has an end 8 which also curves in upward direction but opposite to that of the first length 2. Under normal conditions, it would be either impossible or extremely difficult to join the two ends 6 and 8 of the lengths 2 and 7 together because of their curvature and as explained either each length 2 and 7 is first joined to a straight length of pipe and these straight lengths are joined together or the adjacent ends 6 and 8 of lengths 2 and 7 are straightened by a heavy, cumbersome and expensive machine and then joined together.

However, referring to FIG. 2, in our technique, a length 7 of pipe is wound from the reel 4 sufficient that its end 8 lies adjacent the length 2 and the length 7 is then allowed to rest on the ground, its weight causing it to rotate about its axis by 90° so that its curve lies parallel to the ground.

Then, referring to FIG. 3, a pipe clamp 10 (to be described fully later) is clamped around the end 8 of length 7 with the connecting plate 11 of the clamp 10 positioned on the side of the pipe length 7 opposite to the centre of a notional circle which the pipe end 8 would form if its curve continued endlessly. The plate 11 is then connected by a rope or strop 12 to the bucket 13 of a mechanical excavator (not shown).

Finally, referring to FIG. 4, the excavator bucket 13 is raised to hoist the end 8 of length 7 so that the pipe end 8 is caused to rotate about its axis by a further 90° as the clamp 10 is itself rotated by the strop 12.

The pipe end 8 of the length 7 now curves in a downward direction and therefore in a substantially opposite sense to the upward curve of the end 6 of length 2. This enables the two ends to be brought together quite easily and joined by any convenient technique such as butt-fusion welding or the like.

After the pipe lengths 2 and 7 have been joined together, they are lowered by the excavator to the ground and the clamp 10 removed. The trench can now be extended rearwardly and a further length of pipe reeled from the coiler, cuts off, and laid in the trench before being joined to a further length of pipe and so on until a pipeline comprising several lengths has been laid.

Referring to FIGS. 5 to 9, the pipe clamp 10 is cylindrical and comprises two semi-circular jaws 13 and 14 which can be brought together around the circumference of a length of pipe 7 and which are connected together on one side by a hinge 15, a pair of clamping bolt and nut assemblies 16 and 17 on the other side for releasably securing the jaws 13 and 14 together and means in the form of a plate 18 for releasably connecting the clamp to a hoisting apparatus whereby, in use, the clamp can be raised or lowered to raise and lower the pipe length.

Each jaw 13 and 14 has a respective pair of collar members 19, 20 and 21 and 22, disposed adjacent to the adjoining sides 23 and 24 of the jaws 13 and 14. One collar from one jaw corresponds to the collar of the other jaw to permit the passage therethrough of the threaded shanks 25 and 26 of respective bolts 27 and 28 of the assemblies 16 and 17 when the jaws are closed.

After the pipe has been located in one of the jaws (see FIG. 6) when the clamp is in the open position, the jaws are closed together and the bolts shanks 25 and 26 are located in the collars. Corresponding collars 19 and 21 and 20 and 22 are then forced towards each other to cause the jaws 13 and 14 to be brought together on the pipe and for this purpose nuts 29 and 30 are threaded on the respective bolt shank 25 and 26 and are tightened against their respective collar 21 and 22 to lock the jaws in position on the pipe.

Welded to the uppermost (in this embodiment) jaw 13 of the clamp 10 is a plate 18 located midway between the sides of the jaw 13 which has an eyelet 29 by means of which the plate 18 can be connected to the bucket of a mechanical excavator to lift the clamp and thereby the pipe.

Referring to FIG. 9, in order to clamp pipes of differing diameters, the clamp may be provided with internal rings to reduce the diameter of the throat formed by the jaws. As shown there are pairs of identical rings 30 and 31, 32 and 33, 34 and 35. The ring of each pair is positioned in use at either end of the cylinder so formed when the clamp is in the closed position. Each ring is held in position by a threaded screw 36 which connects each ring via an aperture to the lowermost jaw 14.

In FIG. 9, all the rings are in position so that a pipe of the smallest suitable diameter can be clamped. Removing rings 30 and 31 enables a pipe of the next suitable largest diameter to be clamped, removing rings 32 and 33 enables a still larger pipe to be clamped. Finally removing rings 34 and 35 returns us to the position of the previous Figures. Obviously screws of shorter lengths will be necessary to secure the remaining rings as the other rings are removed.

I claim:

1. A method for permitting the joining together of two adjacent pipe lengths with adjacent ends curving with substantially the same sense, the method comprising rotating the end of one of the pipe lengths about its axis until it curves in substantially the opposite sense to the curve of the adjacent end of the other pipe length.

2. A method as claimed in claim 1 in which the ends of the pipe lengths initially curve in a substantially upward direction.

3. A method as claimed in claim 2 in which one of the pipe lengths is fed from a coil to a position where it lies on the ground.

4. A method as claimed in claim 3 in which the end of the coiled pipe length is rotated so that it curves in a substantially downward direction.

5. A method as claimed in claim 3 in which on leaving the coil the curved end is caused to lie on the ground with its curve parallel to the ground then the end is raised in such a manner that it rotates to a position where it curves in a substantially downward direction.

6. A method as claimed in claim 3 in which the other pipe length is located in a trench with its end curving upwardly.

7. A method as claimed in claim 1 in which the pipe lengths are of a flexible material.

8. A method as claimed in claim 7 in which the material is plastics.

9. A method as claimed in claim 8 in which the plastics is polyethylene.

10. A method as claimed in claim 5 in which the end of the coiled pipe length is raised and lowered by means of a clamp which is releasably connected to a hoisting apparatus.

* * * * *